United States Patent
Yamamura

(10) Patent No.: US 9,128,408 B2
(45) Date of Patent: Sep. 8, 2015

(54) EXPOSURE DEVICE, LED HEAD, IMAGE FORMATION APPARATUS, AND READING APPARATUS

(71) Applicant: Oki Data Corporation, Tokyo (JP)

(72) Inventor: Akihiro Yamamura, Takasaki (JP)

(73) Assignee: Oki Data Corporation, Tokyo (JP)

( * ) Notice: Subject to any disclaimer, the term of this patent is extended or adjusted under 35 U.S.C. 154(b) by 1 day.

(21) Appl. No.: 13/897,472

(22) Filed: May 20, 2013

(65) Prior Publication Data

US 2013/0314752 A1 Nov. 28, 2013

(30) Foreign Application Priority Data

May 28, 2012 (JP) .................................. 2012-120817

(51) Int. Cl.
*H04N 1/21* (2006.01)
*G03G 15/04* (2006.01)
*G02B 3/00* (2006.01)
*G03G 15/043* (2006.01)

(52) U.S. Cl.
CPC .......... *G03G 15/0409* (2013.01); *G02B 3/0037* (2013.01); *G03G 15/0435* (2013.01); *G03G 15/04054* (2013.01); *G02B 3/0062* (2013.01); *G02B 3/0068* (2013.01)

(58) Field of Classification Search
None
See application file for complete search history.

(56) References Cited

U.S. PATENT DOCUMENTS

2009/0322847 A1* 12/2009 Yamamura .................... 347/130
2010/0220375 A1* 9/2010 Yamamura .................... 359/227

FOREIGN PATENT DOCUMENTS

JP 2009-086649 A 4/2009

* cited by examiner

*Primary Examiner* — Chuong A Ngo
*Assistant Examiner* — Idowu O Osifade
(74) *Attorney, Agent, or Firm* — Marvin A. Motsenbocker; Mots Law, PLLC

(57) ABSTRACT

An exposure device includes a first lens plate including first lenses arranged substantially linearly and configured to form an intermediate image being an inverted reduced image of an object, a second lens plate including second lenses arranged substantially linearly in an arrangement direction of the first lenses and configured to form an inverted enlarged image of the intermediate image on a light reception surface, and light emitting elements arranged substantially linearly at pitch PD in the arrangement direction. A shift s in an arrangement pitch between the first lenses in the arrangement direction satisfies $0<s<(m\div(1-m)\times PD)$ where magnification m of the first lenses is a ratio of a size of the intermediate image to a size of the object.

11 Claims, 8 Drawing Sheets

EXPOSURE DEVICE, LED HEAD, IMAGE FORMATION APPARATUS, AND READING APPARATUS

CROSS REFERENCE TO RELATED APPLICATIONS

This application claims priority based on 35 USC 119 from prior Japanese Patent Application No. 2012-120817 filed on May 28, 2012, entitled "EXPOSURE DEVICE, LED HEAD, IMAGE FORMATION APPARATUS, AND READING APPARATUS", the entire contents of which are incorporated herein by reference.

BACKGROUND OF THE INVENTION

1. Field of the Invention

The invention relates to an exposure device, an LED head, an image formation apparatus, and a reading apparatus.

2. Description of Related Art

Heretofore, a lens unit in which two lens arrays, each having linearly arranged lenses, are opposed to each other is used in an optical system of an electrophotographic image formation apparatus using an LED head in which LEDs (Light Emitting Diodes) are linearly arranged, or is used in an optical system of a reading apparatus, such as a scanner or a facsimile machine, configured to form an image of a read original document on a light reception unit in which light reception elements are linearly arranged (for example, see Patent Document 1: Japanese Patent Application Publication No. 2009-86649 (paragraphs and [0029], and FIGS. 4 and 5)).

SUMMARY OF THE INVENTION

However, the conventional technique has a problem in that the lens arrays of the optical system are long and they are difficult to form with a high degree of accuracy.

An embodiment of the invention aims to facilitate the formation of a lens array.

An aspect of the invention is an exposure device including: a first lens plate including first lenses arranged substantially linearly and configured to form an intermediate image, being an inverted reduced image of an object; a second lens plate including second lenses arranged substantially linearly in an arrangement direction of the first lenses and configured to form an inverted enlarged image of the intermediate image on a light reception surface; and light emitting elements arranged substantially linearly at a pitch PD in the arrangement direction. Shift s in an arrangement pitch between the first lenses in the arrangement direction, and satisfies the condition $0<s<<(m\div(1-m))\times PD$ where magnification m of the first lenses is a ratio of a size of the intermediate image to a size of the object.

According to this aspect of the invention, the formation of the lens array is facilitated.

DETAILED DESCRIPTION OF EMBODIMENTS

Figure 1:
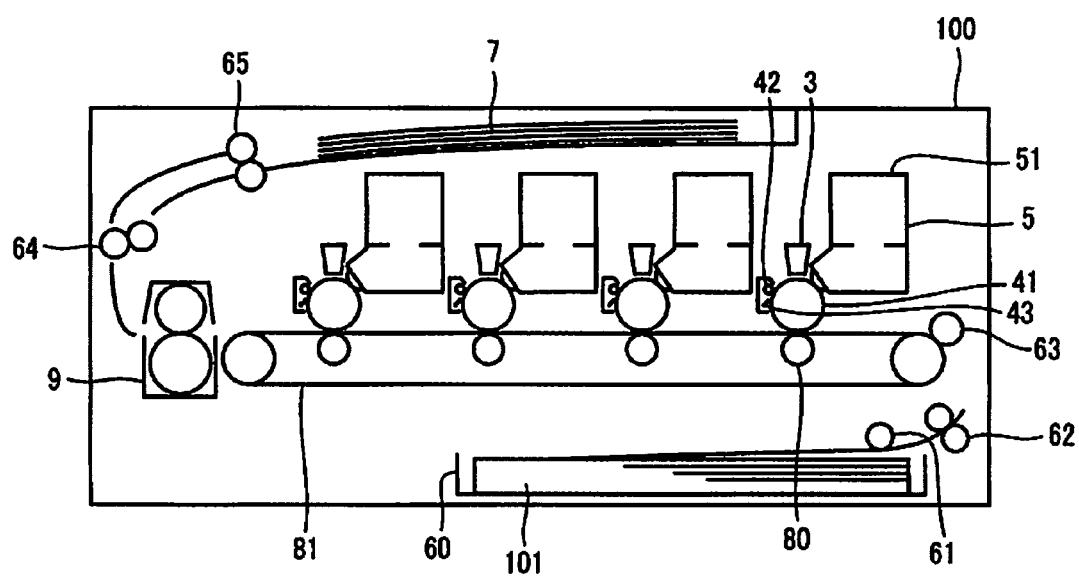
FIG. 1 is a schematic view illustrating a configuration of a printer according to a first embodiment of the invention.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Hereinbelow, embodiments of an exposure device, an LED head, an image formation apparatus, and a reading apparatus according to the invention are described with reference to the drawings.

First Embodiment

A printer as an image formation apparatus according to a first embodiment of the invention is described based on FIG. 1 which is a schematic view illustrating a configuration of the printer of this embodiment. In FIG. 1, printer 100 is configured to form an image on a print medium in accordance with image data by using toner made of a resin which contains a pigment as a coloring material. Paper cassette 60 is attached to printer 100 and is configured to store a stack of paper 101 as print media. Moreover, feed roller 61 and transport rollers 62 and 63 are arranged in printer 100. Feed roller 61 is configured to pick up paper 101 from paper cassette 60, and transport rollers 62 and 63 are configured to transport paper 101 thus fed.

Printer 100 of the invention is a color electrophotographic printer. In printer 100, image formation units are arranged side by side along a transport path of paper 101. The image formation units are configured to form images of yellow, magenta, cyan, and black, respectively. Each of the image formation units includes: photosensitive drum 41 serving as an electrostatic latent image carrier; developer 5 configured to form a toner image on photosensitive drum 41 by developing, with toner, an electrostatic latent image formed on photosensitive drum 41; and toner cartridge 51 configured to supply toner to developer 5.

In addition, charging roller 42 and LED (Light Emitting Diode) head 3, serving as an optical head, are arranged opposed to a surface of photosensitive drum 41. Charging roller 42 is configured to supply electric charges to, and thereby to electrically charge, the surface of photosensitive drum 41. LED head 3 is configured to selectively irradiate the surface of photosensitive drum 41, which is charged by charging roller 42, with light in accordance with image data and thereby to form an electrostatic latent image thereon.

Moreover, transfer roller 80 is disposed opposed to photosensitive drum 41 in such a way as to sandwich transfer belt 81, which serves as a transfer unit configured to transport paper 101, between itself and photosensitive drum 41, and cleaning blade 43 is disposed in contact with the surface of photosensitive drum 41. Transfer roller 80 is configured to transfer, on paper 101, a toner image being an image formed on photosensitive drum 41 by visualizing an electrostatic latent image by use of toner. Cleaning blade 43 is configured to remove toner which is left on the surface of photosensitive drum 41 after paper 101 passes on the transfer unit.

Fixation unit 9, transport rollers 64, and discharge rollers 65 are arranged on a downstream side of the transfer unit. Fixation unit 9 is configured to fix a toner image formed on paper 101 by application of heat and pressure. Transport rollers 64 are configured to transport paper 101 after the passage of fixation unit 9. Discharge rollers 65 are configured to discharge paper 101, which is transported by transport rollers 64, to discharge portion 7 in which to keep a stack of paper 101 having an image formed thereon.

An unillustrated power supply applies predetermined voltages to charging rollers 42 and transfer rollers 80. Transfer belt 81, photosensitive drums 41, and the rollers are driven to rotate by unillustrated motors and unillustrated drive transmission gears. In addition, the unillustrated power supply and a control device are connected to developers 5, LED heads 3, fixation units 9, and the unillustrated motors.

Printer 100 includes an external interface configured to receive print data from an external device, and forms an image on a print medium in accordance with the print data received by the external interface. Printer 100 having the above configuration includes a controller serving as a control unit and a calculation unit configured to store a control program in a storage, such as a memory, and together perform an overall control over printer 100 in accordance with the control program.

Figure 2:
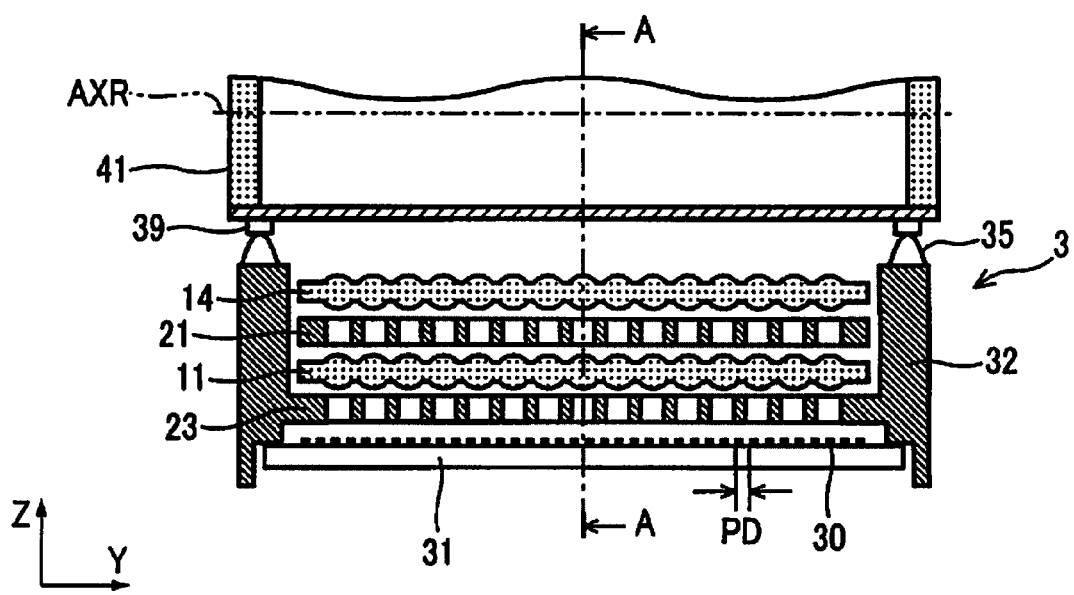
FIG. 2 is a cross-sectional view of an LED head of the first embodiment taken in a long-side direction thereof.
Figure 3:
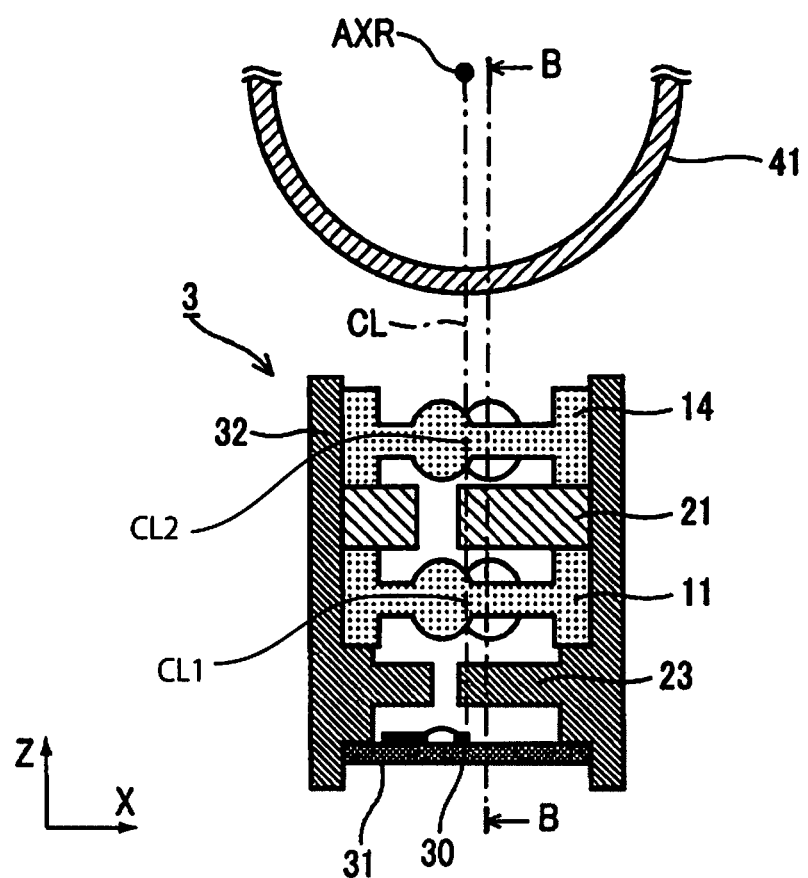
FIG. 3 is a cross-sectional view of the LED head of the first embodiment taken in a short-side direction thereof.

Next, a configuration of each LED head is described by using FIGS. 2 to 4 and FIGS. 5A and 5B. FIG. 2 is a cross-sectional view of the LED head of the first embodiment taken in a long-side direction thereof. FIG. 3 is a cross-sectional view of the LED head of the first embodiment taken in a short-side direction thereof. Here, FIG. 2 is a cross-sectional view of FIG. 3 taken along the B-B line, and FIG. 3 is a cross-sectional view of FIG. 2 taken along the A-A line.

LED head 3 is a long unit. In FIG. 2, the long-side direction of LED head 3 is equal to a horizontal direction of the drawing (Y direction), LED elements 30 as light emitting elements are located in a lower part of the drawing, and photosensitive drum 41 as an imaging surface is located in an upper part of the drawing. In FIG. 3, the long-side direction of LED head 3 is equal to a front-back direction of the drawing, the short-side direction of LED head 3 is equal to the horizontal direction of the drawing (X direction), LED elements 30 are located in a lower part of the drawing, and photosensitive drum 41 as the imaging surface is located in an upper part of the drawing.

LED head 3 includes: substrate 31 on which LED elements 30 as the light emitting elements are arranged substantially linearly; first lens plate 11 configured to form an inverted reduced image of LED elements 30; second lens plate 14 configured to form an inverted enlarged image of the inverted reduced image of LED elements 30; light blocking plate 21 serving as a first light blocking member disposed between the first lens plate 11 and the second lens plate 14; mask 23 serving as a second light blocking member disposed between the LED elements 30 and the first lens plate 11; adjustment member 35 configured to adjust the distance between mask 23 and photosensitive drum 41 as the imaging surface; and holder 32 configured to fix therein substrate 31, first lens plate 11, second lens plate 14, light blocking plate 21, and mask 23. All of substrate 31, first lens plate 11, second lens plate 14, light blocking plate 21, and mask 23 are long members. As illustrated in FIG. 2, these members are arranged to extend in the horizontal direction of the drawing (Y direction) in such a way that their long-side directions extend parallel with one another.

LED elements 30 are arranged substantially linearly at pitches PD. In the case of LED head 3 of 600 dpi (dots per inch) indicating that 600 LED elements 30 are arranged per inch (1 inch=about 25.4 mm), LED elements 30 are arranged at a pitch PD of 0.04233 mm. In the case of LED head 3 of 1200 dpi indicating that 1200 LED elements 30 are arranged per inch, LED elements 30 are arranged at a pitch PD of 0.02117 mm. In the case of LED head 3 of 2400 dpi indicating that 2400 LED elements 30 are arranged per inch, LED elements 30 are arranged at a pitch PD of 0.01058 mm.

In FIG. 2, LED elements 30 are arranged in the horizontal direction of the drawing (Y direction) which is the long-side direction of LED head 3. Reference sign 41 indicates the photosensitive drum on which an electrostatic latent image is formed, and reference sign AXR indicates the rotational axis of photosensitive drum 41. Rotational axis AXR extends in the horizontal direction of the drawing (Y direction) which is parallel with the arrangement direction of LED elements 30.

Reference sign 35 indicates the adjustment member capable of adjusting the interval between surfaces of mask 23 and photosensitive drum 41. Adjustment member 35 is provided to mask 23 in such a way that the interval between the surfaces of mask 23 and photosensitive drum 41 is constant across the horizontal direction of FIG. 2. Adjustment member 35 is an eccentric cam, for example. Reference sign 39 indicates a slide member disposed along the surface of photosensitive drum 41 so that the interval between the surface of photosensitive drum 41 and adjustment member 35 is constant during the rotation of photosensitive drum 41.

In FIG. 3, a width direction (short-side direction) of each of LED head 3, first lens plate 11, and second lens plate 14 is equal to the horizontal direction of the drawing (X direction), and reference sign CL1 indicates a center line of first lens plate 11 in its width direction while reference sign CL2 indicates a center line of second lens plate 14 in its width direction. In this case, as illustrated in FIG. 3, LED elements 30 and rotational axis AXR of photosensitive drum 41 are located on an a plane passing through center lines CL1 and CL2. In other words, plane CL that passes through the rotational axis AXR of photosensitive drum 41 and LED elements 30 are aligned with widthwise center line CL1 of first lens plate 11 and widthwise center line CL2 of second lens plate 14. An optical axis of each of the microlenses of first lens plate 11 and second lens plate 14 extends parallel with plane CL passing through LED elements 30 and rotational axis AXR of photosensitive drum 41, i.e., extends in a vertical direction of FIG. 3 (Z direction).

Figure 4:
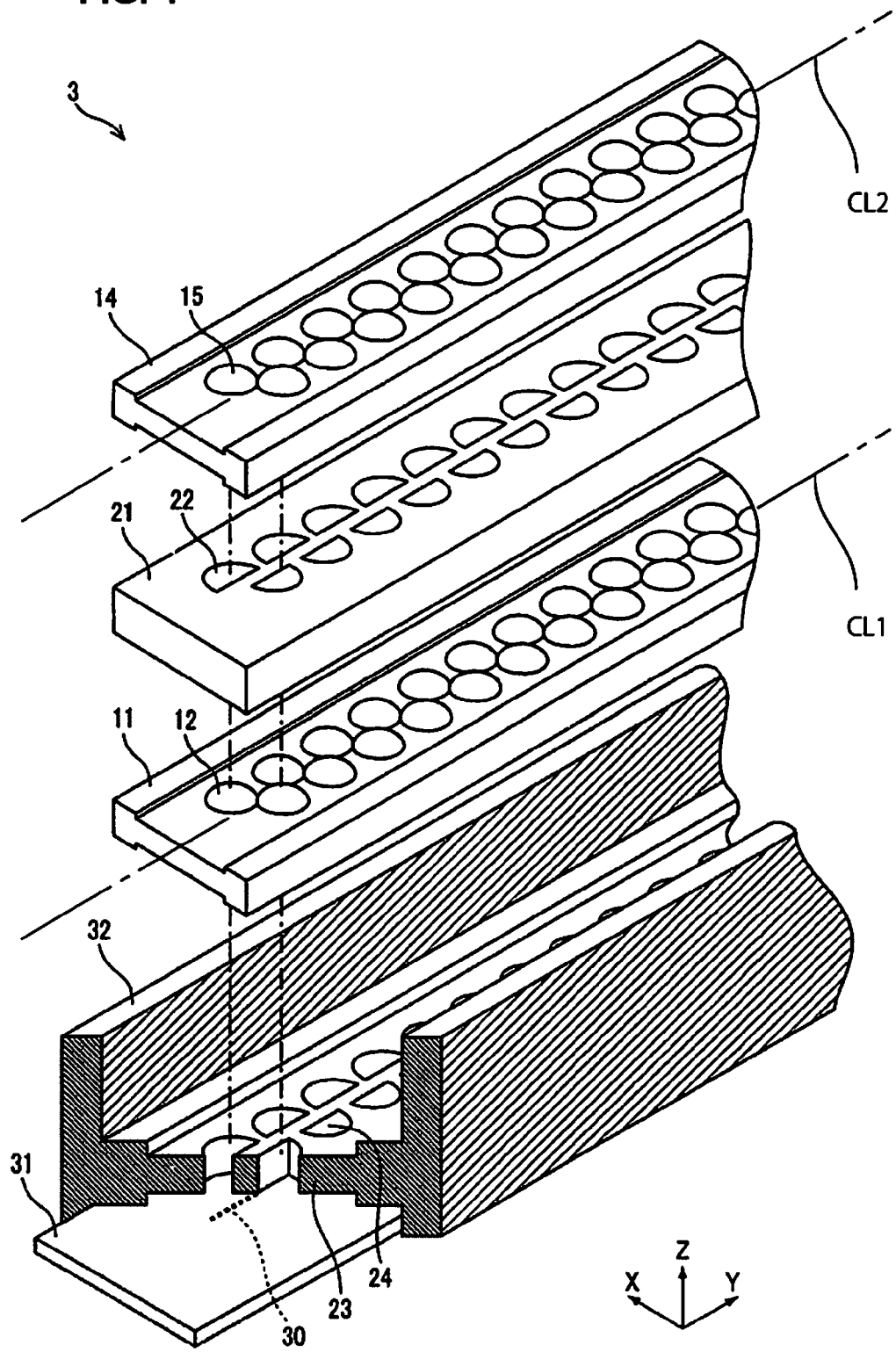
FIG. 4 is an exploded perspective view of the LED head of the first embodiment.

FIG. 4 is an exploded perspective view of the LED head of the first embodiment. In FIG. 4, first lens plate 11, second lens plate 14, and LED elements 30 are arranged in such a way that an optical axis of each of first lenses 12, which are microlenses of first lens plate 11, and second lenses 15, which are microlenses of second lens plate 14, extends in a vertical direction of the drawing (Z direction), that LED elements 30 are located in a lower part of the drawing, and that second lens plate 14 is located in an upper part of the drawing. An image of LED elements 30 is formed in the upper part of the drawing.

In LED head 3, substrate 31 (LED elements 30), mask 23, first lens plate 11, light blocking plate 21, and second lens plate 14 are arranged in this order from the lower part in FIG. 4. First lenses 12 are arranged in two rows on first lens plate 11, second lenses 15 are arranged in two rows on second lens plate 14, first diaphragms 22 are arranged in two rows on light blocking plate 21, and second diaphragms 24 are arranged in two rows on mask 23. First lenses 12, second lenses 15, first diaphragms 22, and second diaphragms 24 are arranged at substantially the same pitches so that positions of the optical axis of each of first lenses 12, the optical axis of the corresponding second lens 15, the corresponding first diaphragm 22, and the corresponding second diaphragm 24 substantially match one another.

In other words, LED head 3 has a configuration where a pair of lens groups formed of microlenses arranged in such away that optical axes of the opposed lenses match each other are arranged substantially linearly in a direction orthogonal to the optical axes of the lenses. Here, light blocking plate 21 and mask 23 are each made of a material designed to block light rays from LED elements 30. Holder 32 is formed integrally with mask 23 across the long-side direction of LED head 3, and fixes therein substrate 31, first lens plate 11, second lens plate 14, light blocking plate 21, and mask 23.

Figure 5A:
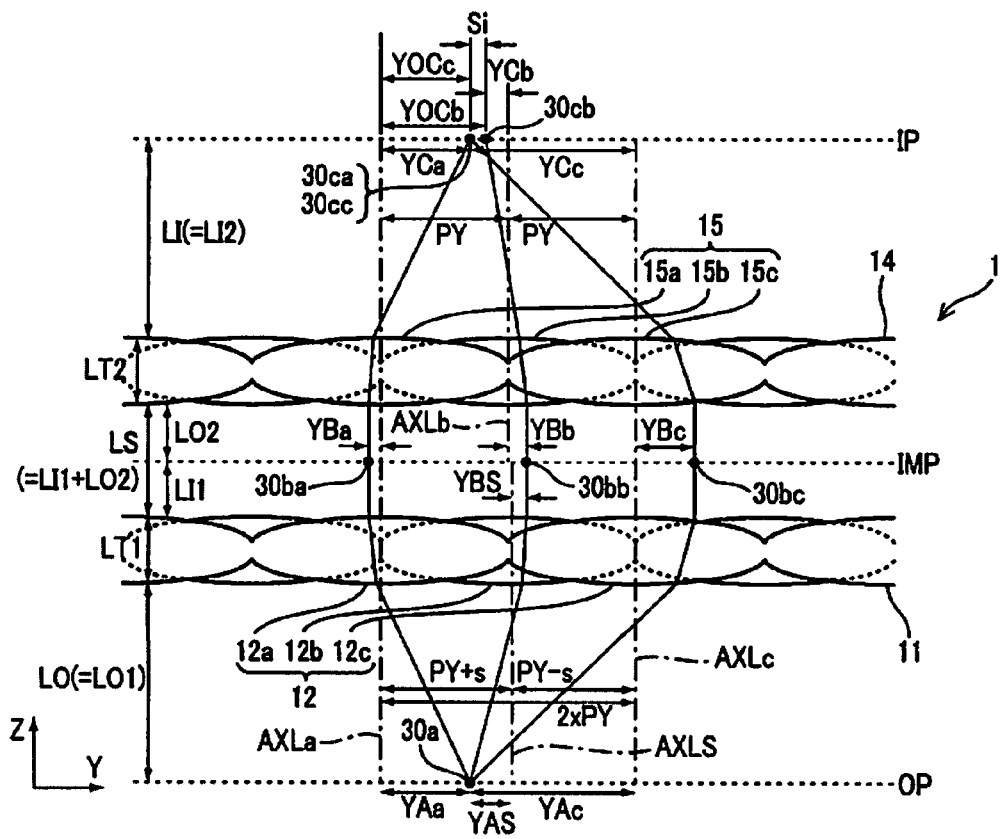
FIGS. 5A and 5B are views for explaining an operation of the lenses of the first embodiment.
Figure 5B:
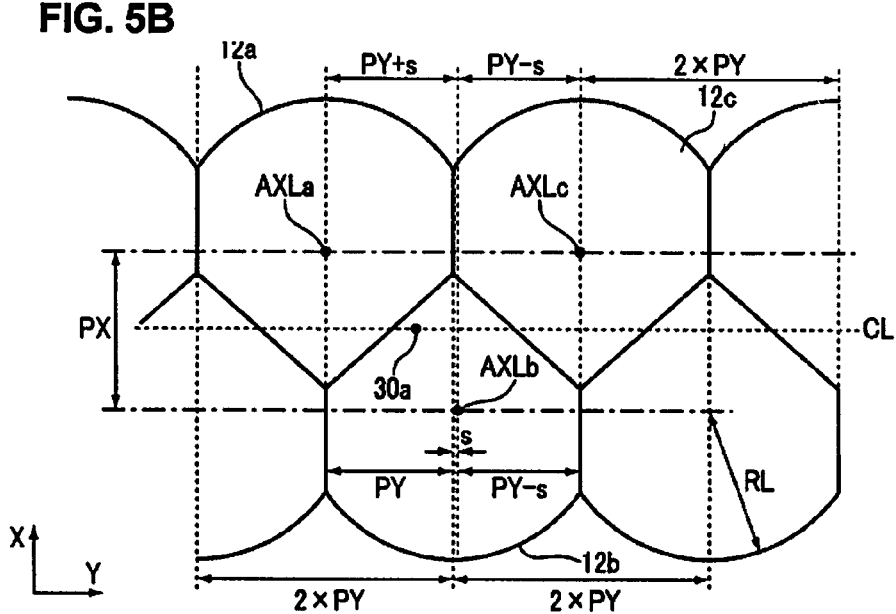

FIGS. 5A and 5B are views for explaining an operation of the lenses of the first embodiment. FIG. 5A is a side view of first lens plate 11 and second lens plate 14, in which the long-side direction of each of first lens plate 11 and second lens plate 14 is equal to a horizontal direction of the drawing, LED element 30a is placed in a lower part of the drawing, and image 30ca is formed in an upper part of the drawing. FIG. 5B is a front view of first lens plate 11, in which the long-side direction of first lens plate 11 is equal to a horizontal direction of the drawing (Y direction), LED element 30a is placed on the front side of the drawing, second lens plate 14 is placed on the back side of the drawing, and image 30ca is formed on the back side of the drawing. Here, the positions of first lenses 12a, 12b, and 12c in FIG. 5B in the horizontal direction of the drawing match the positions of first lenses 12a, 12b, and 12c in FIG. 5A in the horizontal direction of the drawing.

As illustrated in FIG. 5A, the distance between first lenses 12 and object plane OP, which is a plane in which LED element 30a is placed, is set at LO, the interval between surfaces of first lenses 12 and second lenses 15 is set at LS, the interval between imaging plane IP and the surface of second lenses 15 is set at LI, the thickness of each first lens 12 is set at LT1, and the thickness of each second lens 15 is set at LT2. In FIG. 5A, first lens 12a forms intermediate image 30ba in intermediate image plane IMP, which is a distance LI1 away from first lens 12a in a direction of optical axis AXLa, as an image of object 30a which is a distance LO1 away from first lens 12a in the direction of optical axis AXLa. Intermediate image 30ba formed at this time is an inverted reduced image of object 30a.

Second lens 15a forms image 30ca of intermediate image 30ba, which is a distance LO2 away from second lens 15a, in imaging plane IP which is a distance LI2 away from second lens 15a in the direction of optical axis AXLa. Image 30ca formed at this time is a same-size erect image of object 30a. Distance LO between object plane OP and first lenses 12 is set equal to distance LO1. Interval LS between first lenses 12 and second lenses 15 is set equal to LS=LI1+LO2, and distance LI between second lenses 15 and imaging plane IP is set equal to distance LI2.

The shape of first lens plate 11 is next described using FIG. 5B. In FIG. 5B, the horizontal direction (Y direction) is equal to the long-side direction of first lens plate 11. On first lens plate 11, first lenses 12 are alternately arranged zigzag in two rows which are parallel with each other in the long-side direction. As illustrated in FIG. 5B, first lens 12a and first lens 12c are arranged in the same row, whereas first lens 12b is arranged in the other row at a position between first lens 12a and first lens 12c. Here, reference sign AXLa indicates the optical axis of first lens 12a, reference sign AXLb indicates the optical axis of first lens 12b, and reference sign AXLc indicates the optical axis of first lens 12c.

First lenses 12 in each row are arranged at a pitch of 2×PY. Of these lenses, first lens 12b is shifted in the Y direction by a distance s relative to each of adjacent first lenses 12 in the same row, and the arrangement pitch between first lens 12b and first lenses 12 adjacent to first lens 12b in the same row are 2×PY+s and 2×PY−s. Hence, the arrangement pitch between first lens 12a and first lens 12b in the long-side direction of first lens plate 11 is PY+s, and the arrangement pitch between first lens 12b and first lens 12c in the long-side direction of first lens plate 11 is PY−s.

Further, positional shift s (distance s) of first lens 12b satisfies the following Formula 1:

0<s<(m÷(1−m)×PD) . . . (Formula 1), where PD indicates the arrangement pitch between LED elements 30, and magnification m of first lens 12 indicates a ratio of the size of an image formed by first lens 12 in intermediate image plane IMP, which is distance LI1 away from first lens 12, to the size of an object in object plane OP, which is distance LO1 away from first lens 12. No flat portion is formed between any two adjacent first lenses 12, and therefore any two adjacent first lenses 12 abut on each other at their boundary and are arranged densely without any gap in between. In other words, a radius of each first lens 12 in the long-side direction of first lens plate 11 is equal to PY. In addition, radius RL of first lens 12 is larger than PY.

The arrangement pitch between first lenses 12 in the width direction of first lens plate 11 (X direction) orthogonal to the long-side direction of first lens plate 11 is equal to PX. Arrangement pitch PX between first lenses 12 in the X direction is smaller than the arrangement pitch between first lenses 12 in the Y direction (2×PY). Here, first lens plate 11 is made of a material designed to transmit light rays from LED element 30a serving as a light emitting unit.

Second lens plate 14 has the same shape as first lens plate 11. Moreover, second lenses 15 have the same shape and are arrayed in the same manner as first lenses 12. As illustrated in FIG. 5A, second lens 15a is arranged in such a way that its optical axis matches optical axis AXLa of first lens 12a. Second lens 15b is arranged in such a way that its optical axis AXLb is shifted from optical axis AXLS of first lens 12b by distance in the long-side direction of second lens plate 14. Second lens 15c is arranged in such a way that its optical axis matches optical axis AXLc of first lens 12c.

Besides, the arrangement pitch between second lens 15a and second lens 15b and the arrangement pitch between second lens 15b and second lens 15c in the long-side direction of second lens plate 14 are both equal to PY. Here, first lens plate 11 is made of a material designed to transmit light rays from LED element 30a serving as the light emitting unit.

Now, a description is given of how the above configuration works. First of all, an operation of printer 100 is described based on FIG. 1. The surface of each photosensitive drum 41 of printer 100 is electrically charged by charging roller 42 to which a certain voltage is applied from the unillustrated power supply. Then, when the charged surface of photosensitive drum approaches LED head 3 along with the rotation of photosensitive drum 41, the charged surface is exposed to LED head 3 whereby an electrostatic latent image is formed thereon. The electrostatic latent image thus formed is developed by developer 5, and thereby a toner image is formed on the surface of photosensitive drum 41.

Meanwhile, paper 101 set in paper cassette 60 is picked up from paper cassette 60 by feed roller 61, and is then transported to the vicinity of transfer roller 80 and transfer belt 81 by transport rollers 62 and 63. When the toner image on the surface of photosensitive drum 41 obtained by the development approaches transfer roller 80 and transfer belt 81 along with the rotation of photosensitive drum 41, the toner image on the surface of photosensitive drum 41 is transferred onto paper 101 by means of transfer belt 81 and transfer roller 80 to which the certain voltage is applied from the unillustrated power supply.

Subsequently, paper 101 having the toner images of the respective colors formed on its surface is transported to fixation unit 9 along with the rotation of transfer belt 81. Fixation unit 9 melts the toner images on paper 101 by applying pressure and heat to fix the toner images onto the surface of paper 101. Paper 101 on which the toner images are fixed is then discharged to discharge portion 7 by transport rollers 64 and discharge rollers 65. Thus, the operation of printer 100 is completed.

Next, the operation of LED head 3 is described based on FIG. 5A. When a controller of the printer sends a control signal to LED head 3 illustrated in FIG. 3 in accordance with image data, a driver IC on substrate 31 drives LED elements 30 to emit light at any light intensity in accordance with the control signal. First lens 12a forms intermediate image 30ba in intermediate image plane IMP as an image of object 30a. Intermediate image 30ba formed at this time is an inverted reduced image of object 30a.

Second lens 15a forms image 30ca in imaging plane IP as an image of intermediate image 30ba. Image 30ca formed at this time is a same-size erect image of object 30a. First lens 12b forms intermediate image 30bb in intermediate image plane IMP as an image of object 30a. Intermediate image 30bb formed at this time is an inverted reduced image of object 30a. Second lens 15b forms image 30cb in imaging plane IP as an image of intermediate image 30bb. Image 30cb formed at this time is a same-size erect image of object 30a.

First lens 12c forms intermediate image 30bc in intermediate image plane IMP as an image of object 30a. Intermediate image 30bc formed at this time is an inverted reduced image of object 30a. Second lens 15c forms image 30cc in imaging plane IP as an image of intermediate image 30bc. Image 30cc formed at this time is a same-size erect image of object 30a.

The ratio of the size of an image formed by first lens 12 in intermediate image plane IMP to the size of an object in object plane OP is set at m, and the ratio of the size of an image formed by second lens 15 in imaging plane IP to the size of the intermediate image in intermediate image plane IMP is set at M. Since the optical system of this embodiment forms a same-size erect image, the ratio of the size of the image in imaging plane IP to the size of the object in object plane OP is "1". Hence, the following formula is satisfied:

$$m \times M = 1, \text{ i.e., } M = 1/m \quad \text{(Formula 101)}.$$

Subsequently, the shift of an imaging position caused by shift s (distance s) in the arrangement pitch between the lenses according to this embodiment is described using FIGS. 5A and 5B. Provided that distance YAa between object 30a and optical axis AXLa in the long-side direction of lens plate 11 (Y direction) is defined as:

YAa=y . . . (Formula 102), distance YBa between intermediate image 30ba and optical axis AXLa in the long-side direction of lens plate 11 (Y direction) is obtained from Formula 102 as:

$$YBa = m \times YAa = m \times y.$$

Distance YCa between image 30ca and optical axis AXLa in the long-side direction of lens plate 11 (Y direction) is obtained from Formula 101 as:

$$YCa = M \times YBa = M \times m \times y \quad \text{(Formula 103)}.$$

Meanwhile, since the arrangement pitch between first lens 12a and first lens 12b is PY+s, distance YAS between object 30a and optical axis AXLS in the long-side direction of first lens plate 11 (Y direction) is obtained from Formula 102 as:

$$YAS = YAa - (PY+s) = y - PY - s \quad \text{(Formula 104)}.$$

Distance YBS between intermediate image 30bb and optical axis AXLS in the long-side direction of first lens plate 11 (Y direction) is obtained as:

$$YBS = m \times YAS = m \times (y - PY - s) \quad \text{(Formula 105)}.$$

In the meantime, distance YBb between intermediate image 30bb and optical axis AXLb in the long-side direction of first lens plate 11 (Y direction) is obtained from Formula 105 as:

$$YBb = YBS + s = m \times (y - PY - s) + s \quad \text{(Formula 106)}.$$

Distance YCb between intermediate image 30cb and optical axis AXLb in the long-side direction of second lens plate 14 (Y direction) is obtained from Formulae 101 and 106 as:

$$YCb = m \times YBb = M \times (m \times (y - PY - s) + s) = y - PY - s - s/m \quad \text{(Formula 107)}.$$

Hence, since the arrangement pitch between second lens 15a and second lens 15b is PY, distance YOCb between image 30cb and optical axis AXLa in the long-side direction of second lens plate 14 (Y direction) is obtained from Formula 107 as:

$$YOCb = PY + YCb = y - s - s/m = y - s(1 - 1/m) \quad \text{(Formula 108)}.$$

Thus, size Si of the positional shift of image 30cb from image 30ca in the long-side direction of second lens plate 14 (Y direction) is obtained from Formulae 102 and 108 as:

$$Si = YOCb - YCa = s(1/m - 1) \quad \text{(Formula 109)}.$$

Meanwhile, since the arrangement pitch between first lens 12a and first lens 12c adjacent to each other in the same row is 2×PY, distance YAc between object 30a and optical axis AXLc in the long-side direction of first lens plate 11 (Y direction) is obtained from Formula 102 as:

$$YAc = YAa - 2 \times PY = y - 2PY \quad \text{(Formula 110)}.$$

Distance YBc between intermediate image 30bc and optical axis AXLc in the long-side direction of first lens plate 11 (Y direction) is obtained from Formula 110 as:

$$YBc = m \times YAc = m \times (y - 2PY) \quad \text{(Formula 111)}.$$

Distance YCc between image 30cc and optical axis AXLc in the long-side direction of second lens plate 14 (Y direction) is obtained from Formulae 101 and 111 as:

$$YCc = M \times YBc = M \times m \times (y - 2PY) = y - 2PY \quad \text{(Formula 112)}.$$

Thus, since the arrangement pitch between second lens 15a and second lens 15c is 2×PY, distance YOCc between image 30cc and optical axis AXLa in the long-side direction of second lens plate 14 (Y direction) is obtained from Formula 112 as:

YOCc=2×PY+YCc=y. Accordingly, no positional shift between image 30ca and image 30cc occurs in the long-side direction of second lens plate 14 (Y direction), and images 30ca and 30cc are formed at one point.

Next, a description is given of the size of positional shift Si (distance Si) between images and print image quality defects. Since the lens unit of this embodiment is designed to form a same-size erect image, images of LED elements 30 are formed at the same pitch as pitch PD between LED elements 30 as illustrated in FIG. 2. Accordingly, if positional shift Si of image 30cb due to positional shift s of first lens 12b is larger than pitch PD, images of LED elements adjacent to LED element 30a in the same row overlap image 30cb adjacent in the other row. This reduces the contrast of an image and causes streaks and density spots (density variations) on a print image.

Hence, the reduction in image contrast does not occur if 0<Si=s(1/m−1)<PD (which is obtained from Formula 109) is satisfied, where m indicates a magnification of first lens 12, indicates a positional shift of first lens 12b, and PD indicates the arrangement pitch between LED elements 30, and Si indicates the positional shift between images. Thus, print image quality degradation does not occur when positional shift s of first lens 12b satisfies Formula 1 described above.

Further, as a result of a print image evaluation using the image formation apparatus of this embodiment, it is found that print image quality degradation does not occur when the number of lenses having a positional shift s in the arrangement pitch in the long-side direction of first lens plate 11 satisfying Formula 1 is equal to or larger than 80 percent of the total number of first lenses 12.

The image formation apparatus used for evaluation is an LED printer having a resolution of 600 dpi, and the arrangement pitch PD between LED elements 30 is 0.04233 mm. The number of lenses having a positional shift s of first lens 12b equal to or smaller than 0.042 mm is 80 percent of the total number of lenses, and the number of lenses having a positional shift s larger than 0.042 mm is 20 percent of the total number of lenses. Magnification m of first lens 12 is 0.5.

To put if differently, since the right-hand side of Formula 1 described above is m/(1−m)×PD=0.5/0.5×0.04233=0.04233 (mm), 80 percent of the total number of first lenses 12 in the image formation apparatus used for evaluation satisfies Formula 1. As a result, neither streaks nor density spots (density variations) occur on a print image even when 20 percent of the total number of first lenses 12 does not satisfy Formula 1.

Figure 8A:
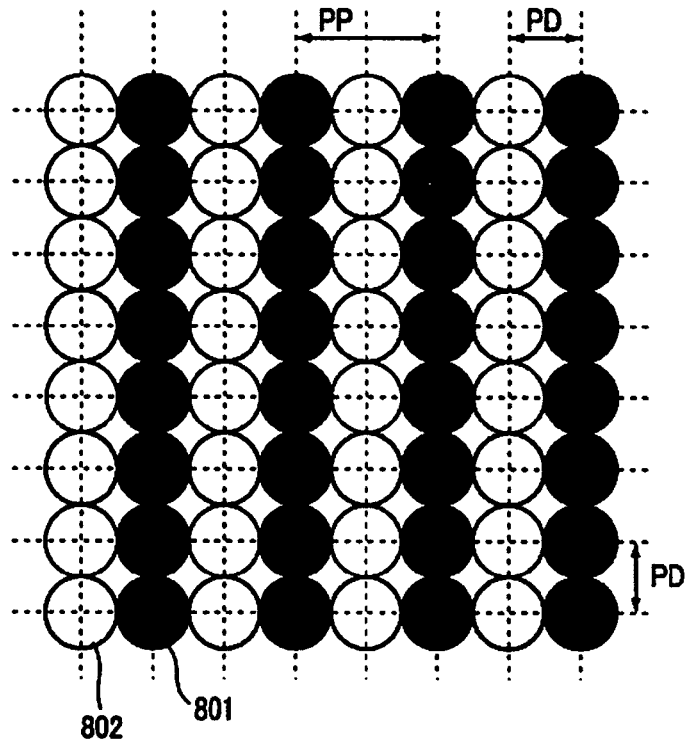
FIGS. 8A and 8B are views for explaining how to evaluate an image formed by the image formation apparatus according to the first embodiment.
Figure 8B:
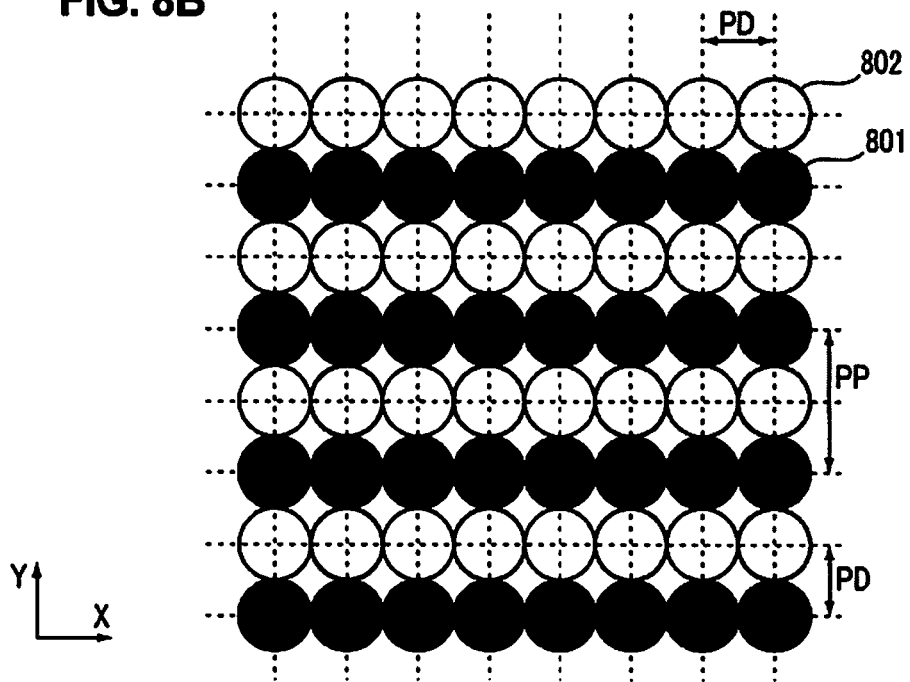

To evaluate an image formed by the image formation apparatus, an evaluation is made on whether streaks or density spots occur when an image illustrated in FIG. 8A or FIG. 8B is printed. In FIGS. 8A and 8B, 801 indicate dots colored with toner, and 802 indicate blank dots without toner. All the dots have an arrangement pitch PD of 0.04233 mm, except for dots 801 having an arrangement pitch PP of 0.08466 mm. In other words, this image is a gray image formed by alternately lighting up LED elements 30. Here, pitch PP between dots 801 is 2×PD.

As described above, according to the first embodiment, since the lens array has the above configuration, the formation of the lens array can be facilitated. Moreover, an image with high contrast can be formed even when the accuracy of the shape of the lens array is degraded. This brings about an effect that the image formation apparatus can form a high-quality print image without any streaks or density spots (density variations) thereon.

Second Embodiment

Figure 6:
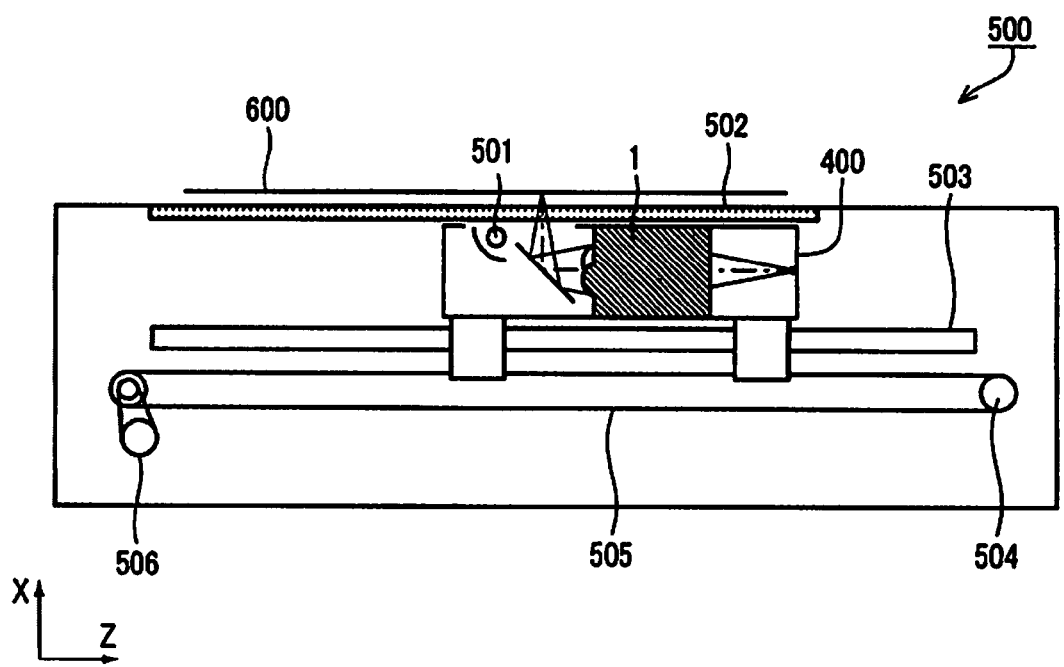
FIG. 6 is a schematic view illustrating a configuration of a reading apparatus according to a second embodiment.

A configuration of a second embodiment of the invention is described based on FIG. 6 which is a schematic view illustrating a configuration of a reading apparatus according to the second embodiment. Note that parts of the second embodiment which are the same as those of the first embodiment described above are given the same reference signs and description thereof is omitted. In FIG. 6, reference sign 500 indicates a scanner as a reading apparatus configured to read an original document and create electronic data of the original document as image data.

Scanner 500 includes reading head 400, lamp 501, platen 502, rail 503, drive belt 505, motor 506, and the like. Reading head 400 is configured to capture light rays emitted from lamp 501 as a lighting device and reflected by a surface of original document 600 and to convert the light rays into electronic data. Lamp 501 is disposed at such a position that light rays emitted from lamp 501 are reflected by the surface of original document 600 and captured by reading head 400.

Platen 502 is used for placing thereon original document 600 from which electronic data is generated, and is made of a material designed to transmit visible light. Rail 503 is disposed below platen 502 and makes reading head 400 movable. Part of reading head 400 is connected to drive belt 505 wound around pulleys 504, and is movable on rail 503 by means of drive belt 505 driven by motor 506.

Figure 7A:
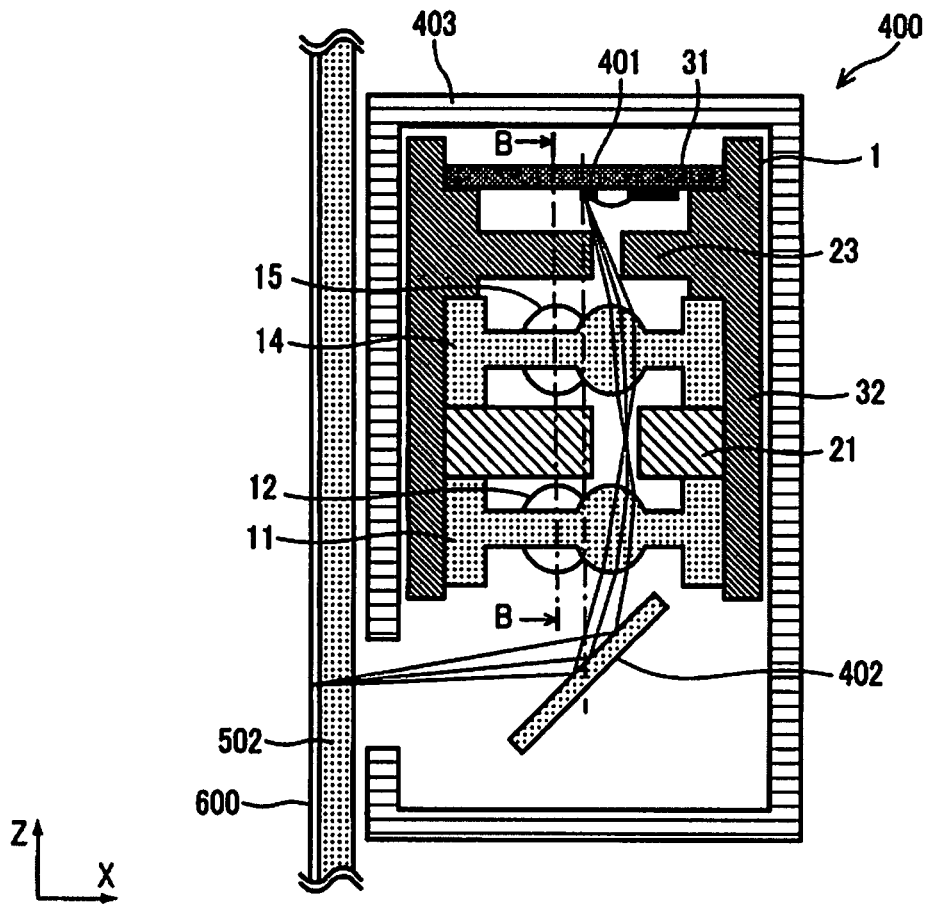
FIGS. 7A and 7B are schematic views illustrating a configuration of a reading head of the reading apparatus according to the second embodiment.
Figure 7B:
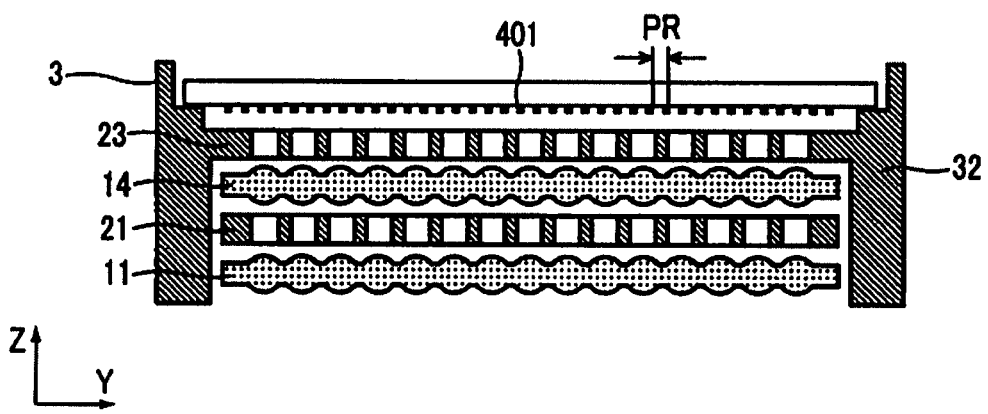

Next, a configuration of reading head 400 is described based on FIGS. 7A and 7B which are schematic views illustrating the configuration of the reading head of the reading apparatus according to the second embodiment. FIG. 7A is a cross-sectional view of FIG. 6 taken along a plane orthogonal to a long-side direction of lens unit 1, in which the long-side direction of lens unit 1 is equal to a front-back direction of the drawing. Mirror 402 is located in a lower part of the drawing, and line sensor 401 is located in an upper part of the drawing. FIG. 7B is a cross-sectional view of FIG. 7A taken along the B-B line, in which the long-side direction of lens unit 1 is equal to a horizontal direction of the drawing (Y direction). Mirror 402 is located in a lower part of the drawing, and line sensor 401 is located in an upper part of the drawing. In FIGS. 7A and 7B, reading head 400 includes lens unit 1, line sensor 401, and mirror 402.

Lens unit 1 has the same configuration as the first embodiment. In lens unit 1, mask 23, second lens plate 14, light blocking plate 21, and first lens plate 11 are arranged in this order from the upper part in FIGS. 7A and 7B. As illustrated in FIG. 4, first lenses 12 are arranged in two rows on first lens plate 11, second lenses 15 are arranged in two rows on second lens plate 14, first diaphragms 22 are arranged in two rows on light blocking plate 21, and second diaphragms 24 are arranged in two rows on mask 23. First lenses 12, second lenses 15, first diaphragms 22, and second diaphragms 24 are arranged at substantially the same pitches so that positions of the optical axis of each of first lenses 12, the optical axis of the corresponding second lens 15, the corresponding first diaphragm 22, and the corresponding second diaphragm 24 substantially match one another.

Holder 32 is formed integrally with mask 23 across the long-side direction of lens unit 1, and fixes therein first lens plate 11, second lens plate 14, light blocking plate 21, and mask 23. Mirror 402 is configured to bend the optical path of light rays reflected by original document 600 so that the light rays are incident on lens unit 1. Line sensor 401 has light reception elements arranged linearly at pitch PR, and is configured to convert, into electrical signals, an image of the original document image formed by lens unit 1.

In this embodiment, the components are arranged in such a way that original document 600 constitutes object plane OP of lens array 1 illustrated in FIGS. 5A and 5B, and line sensor 401 constitutes imaging plane IP of lens array 1. Lens unit 1 of this embodiment has the same configuration as the first embodiment. Positional shift s of first lens 12b is set to satisfy the following Formula 2:

0<s<<(m÷(1−m)×PR) . . . (Formula 2), where PR indicates the arrangement pitch between the light reception elements of line sensor 401 illustrated in FIG. 7B, and m indicates the magnification of first lens 12.

Now, a description is given of how the above configuration works. First of all, an operation of the reading apparatus is described based on FIG. 6. Once lamp 501 is turned on and emits light to the surface of original document 600, light rays reflected by the surface of original document 600 are captured by reading head 400. Together with lamp 501, reading head 400 is moved in a lateral direction of FIGS. 8A and 8B by drive belt 505 driven by motor 506, and captures light rays reflected by the entire surface of original document 600.

Next, an operation of reading head 400 is described based on FIGS. 7A and 7B. Light rays reflected by original document 600 are transmitted through platen 502, and then enter lens unit 1 with their optical path bent by mirror 402. Lens unit 1 forms an image of the original document image on line sensor 401. Line sensor 401 converts the image of the original document image thus formed into electrical signals to generate electronic data.

As a result of forming image data from an original document in the reading apparatus of this embodiment, image data with quality as good as the original document can be obtained. Further, with the configuration of the lens array of this embodiment, the contrast of an image can be increased sufficiently even when the accuracy of the shape of the lens array is lowered. As described above, the second embodiment brings about an effect that the reading apparatus can also achieve the same effect as the first embodiment and can read image data with the same quality as the original document.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An exposure device comprising:
a first lens plate including a first row of first lenses arranged substantially linearly and a second row of first lenses arranged substantially linearly and configured to form an intermediate image being an inverted reduced image of an object;
a second lens plate including second lenses arranged substantially linearly in an arrangement direction of the first lenses and configured to form an inverted enlarged image of the intermediate image on a light reception surface; and
light emitting elements arranged substantially linearly at pitch PD in the arrangement direction, wherein
a shift s in an arrangement pitch between the first lenses in the first row of the first lens plate and the first lenses in the second row of the first lens plate in the arrangement direction satisfies $0<s<(m\div(1-m)\times PD)$ where a magnification m of the first lenses is a ratio of a size of the intermediate image to a size of the object.

2. The exposure device according to claim 1, wherein a number of the first lenses satisfying $0<s<(m\div(1-m)\times PD)$ is equal to or larger than 80 percent of the total number of the first lenses.

3. The exposure device according to claim 1, wherein the light emitting elements are formed of LED elements so that the exposure device forms a LED head.

4. An image formation apparatus comprising the exposure device according to claim 1.

5. An image formation apparatus comprising the LED head as the exposure device according to claim 3.

6. A image formation apparatus comprising:
the exposure device according to claim 1; and
an image carrier rotatably provided at a position facing the exposure device such that a surface of the image carrier can be exposed to light from the exposure device, wherein
a plane that passes through the rotational axis of the image carrier and the light emitting elements is substantially aligned with a widthwise center of the first lens plate and a widthwise center of the second lens plate.

7. A image formation apparatus according to claim 6, wherein
the first lens plate and the second lens plate are provided between the image carrier and the light emitting elements in a direction along the optical axis of the first lens,
the first lens plate is provided on the light emitting elements side, and
the second lens plate is provided on the image carrier side.

8. A image formation apparatus according to claim 7, wherein
a first light blocking member is provided between the first lens plate and the second lens plate in the direction along the optical axis of the first lens,
the first light blocking member is formed with first diaphragms aligned with both the first lenses and the second lenses.

9. A image formation apparatus according to claim 8, wherein
a second light blocking member is provided between the first lens plate and the light emitting elements in the direction along the optical axis of the first lens,
the second light blocking member is formed with second diaphragms aligned with the first lenses.

10. A reading apparatus comprising:
a first lens plate including a first row of first lenses arranged substantially linearly and a second row of first lenses arranged substantially linearly and configured to form an intermediate image being an inverted reduced image of an object;
a second lens plate including second lenses arranged substantially linearly in an arrangement direction of the first lenses and configured to form an inverted enlarged image of the intermediate image on a light reception surface; and
light reception elements arranged substantially linearly at a pitch PR in the arrangement direction, wherein
a shift s in an arrangement pitch between the first lenses in the first row of the first lens plate and the first lenses in the second row of the first lens plate in the arrangement direction satisfies $0<s<(m\div(1-m)\times PR)$ where a magnification m of the first lenses is a ratio of a size of the intermediate image to a size of the object.

11. The reading apparatus according to claim 10, wherein a number of the first lenses satisfying $0<s<(m\div(1-m)\times PR)$ is equal to or larger than 80 percent of the total number of the first lenses.

* * * * *